April 2, 1963  E. Z. GABRIEL  3,083,901
COMPUTERS

Filed Jan. 25, 1960  3 Sheets-Sheet 1

INVENTOR.
BY Edwin Z. Gabriel
Howard P. King
ATTORNEY

April 2, 1963  E. Z. GABRIEL  3,083,901
COMMUTERS
Filed Jan. 25, 1960  3 Sheets-Sheet 2
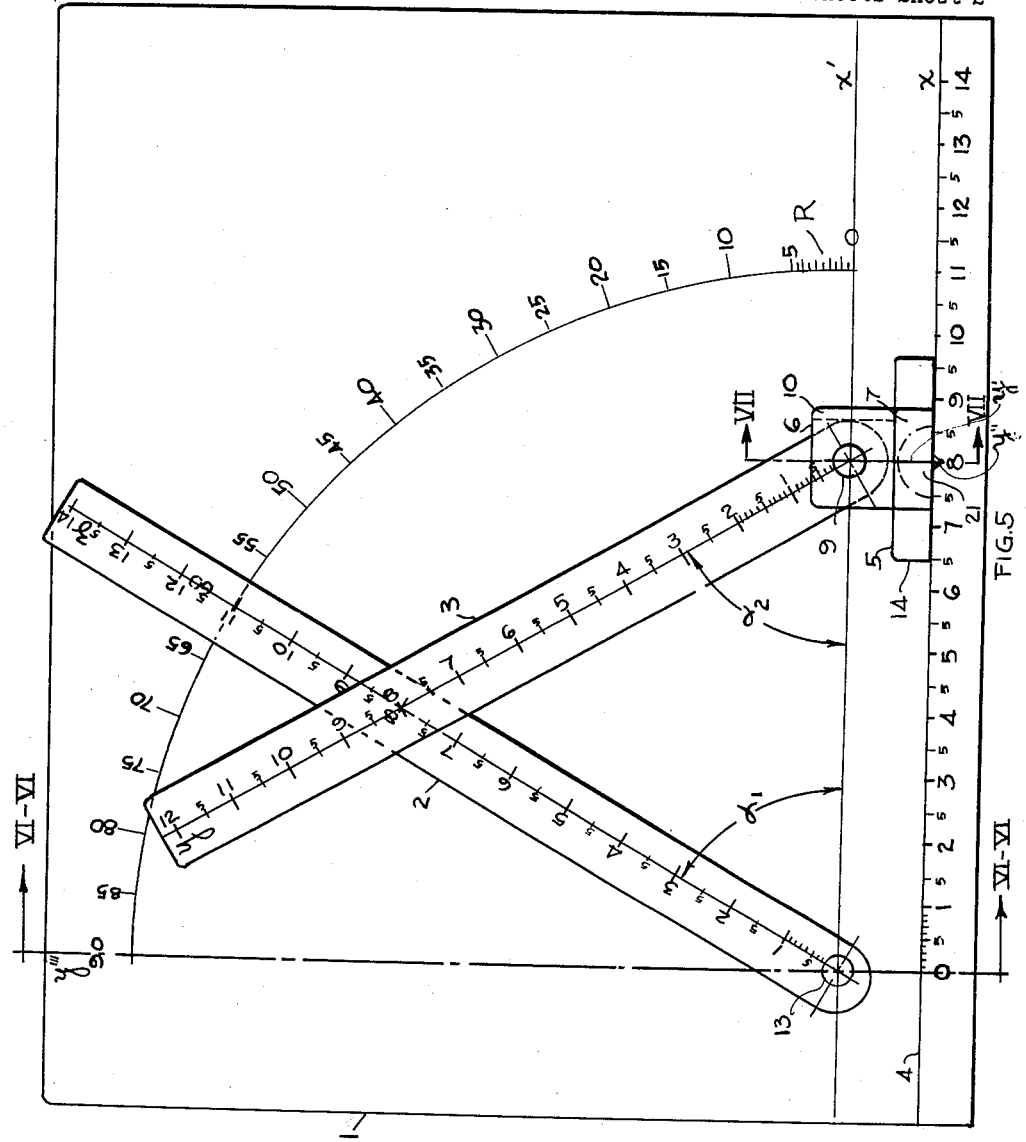
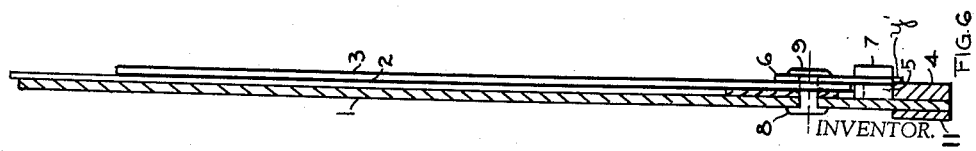
INVENTOR.
BY Edwin Z. Gabriel
Howard P. Ling
ATTORNEY April 2, 1963  E. Z. GABRIEL  3,083,901
COMPUTERS Filed Jan. 25, 1960  3 Sheets-Sheet 3

INVENTOR.
BY Edwin Z. Gabriel
Howard P. King
ATTORNEY

United States Patent Office 3,083,901
Patented Apr. 2, 1963

3,083,901
COMPUTERS
Edwin Z. Gabriel, St. Davids, Pa.
(91 Mount Tabor Way, Ocean Grove, N.J.)
Filed Jan. 25, 1960, Ser. No. 4,501
12 Claims. (Cl. 235—61)

This invention relates to computers and more particularly to a manual type of computer adapted to solution of various problems met with in mathematics, examples of which may be mentioned multiplication, division, solving for unknowns in triangular geometric problems and including solutions involving oblique triangles.

The invention proposes an instrument from which readings may be made with corresponding accuracy as with the readings from slide rules so that it may be used in conjunction with a slide rule by interchange of readings from one to the other with equal dependability.

The invention contemplates a computer which is usable both for solution of problems involving right triangles and oblique triangles.

A computer is provided by this invention capable of checking results of trigonometric problems initial solution of which has been made by some other method.

Another object of the invention is to provide a simple construction capable of readily giving answers in problems of multiplication and division, and with equal accuracy as with a slide rule, and more quickly.

A further object of the invention is to provide a mechanical structure usable for laying out work and solutions with delineations at desired angles and prescribed lengths.

In a broad aspect, the invention may be said to provide a structure which will physically designate lengths of sides of triangles and angles between sides for direct reading of unknowns of either or both linear or angular character.

It is an objective to effect a saving of time-consuming repetitive and fatiguing operations in solving problems.

Other objects, advantages and novel structural features contemplated in the invention will appear to persons skilled in the art to which it appertains as the description proceeds, both by direct recitation thereof and by inference from the context.

Referring to the accompanying drawings, in which like numerals of reference indicate similar parts throughout the several views;

FIGURE 5 is a plan, similar to FIG. 1, and showing the movable members both making angles less than 90° with the base member for solution of oblique triangle problems;

FIGURE 6 is a vertical section on line VI—VI of FIG. 5;

Figure 1:
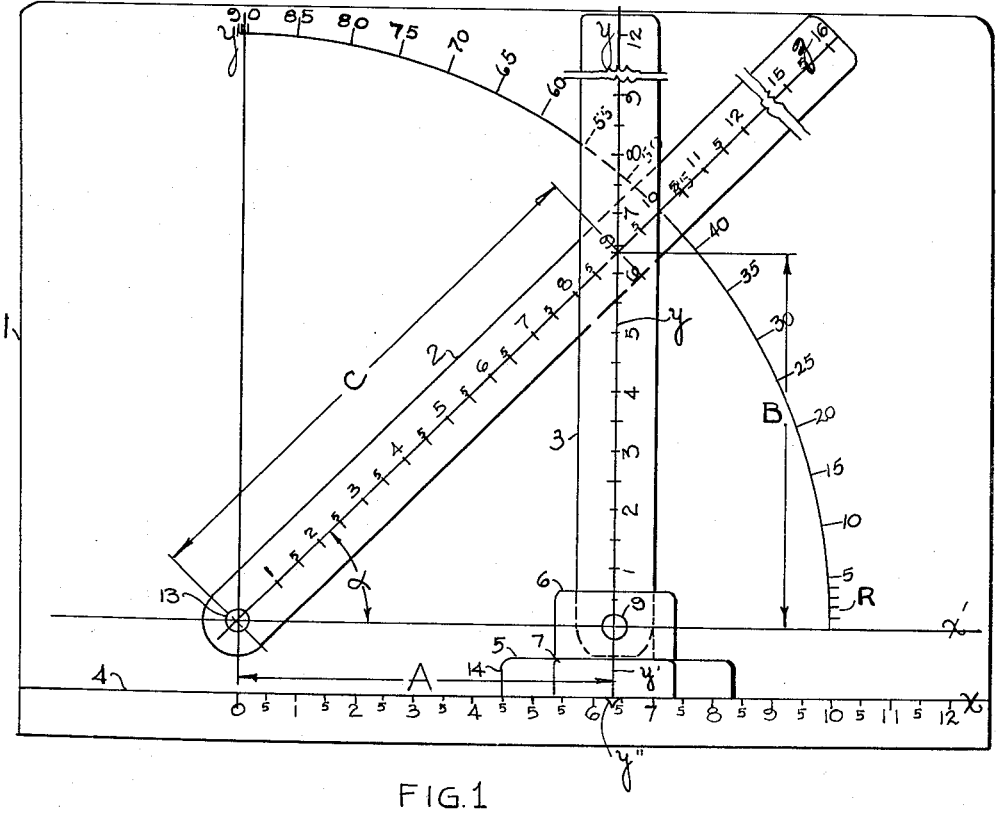
FIGURE 1 is a plan of a computer wherein the $y$-scale member is arbitrarily shown at right angles to the $x$-scale member.
Figure 2:
FIGURE 2 is an enlarged face view of the proposed scale delineations on the movable members, and which, because of closeness of lines, are only shown in part in FIG. 1.
Figure 7:
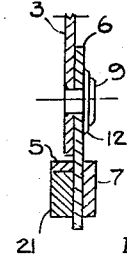
FIGURE 7 is a sectional view of a part of and on greater scale than FIG. 6, for more clearly indicating the presence of a spring washer on the pivot for the movable member there shown, on line VII—VII.
Figure 9:
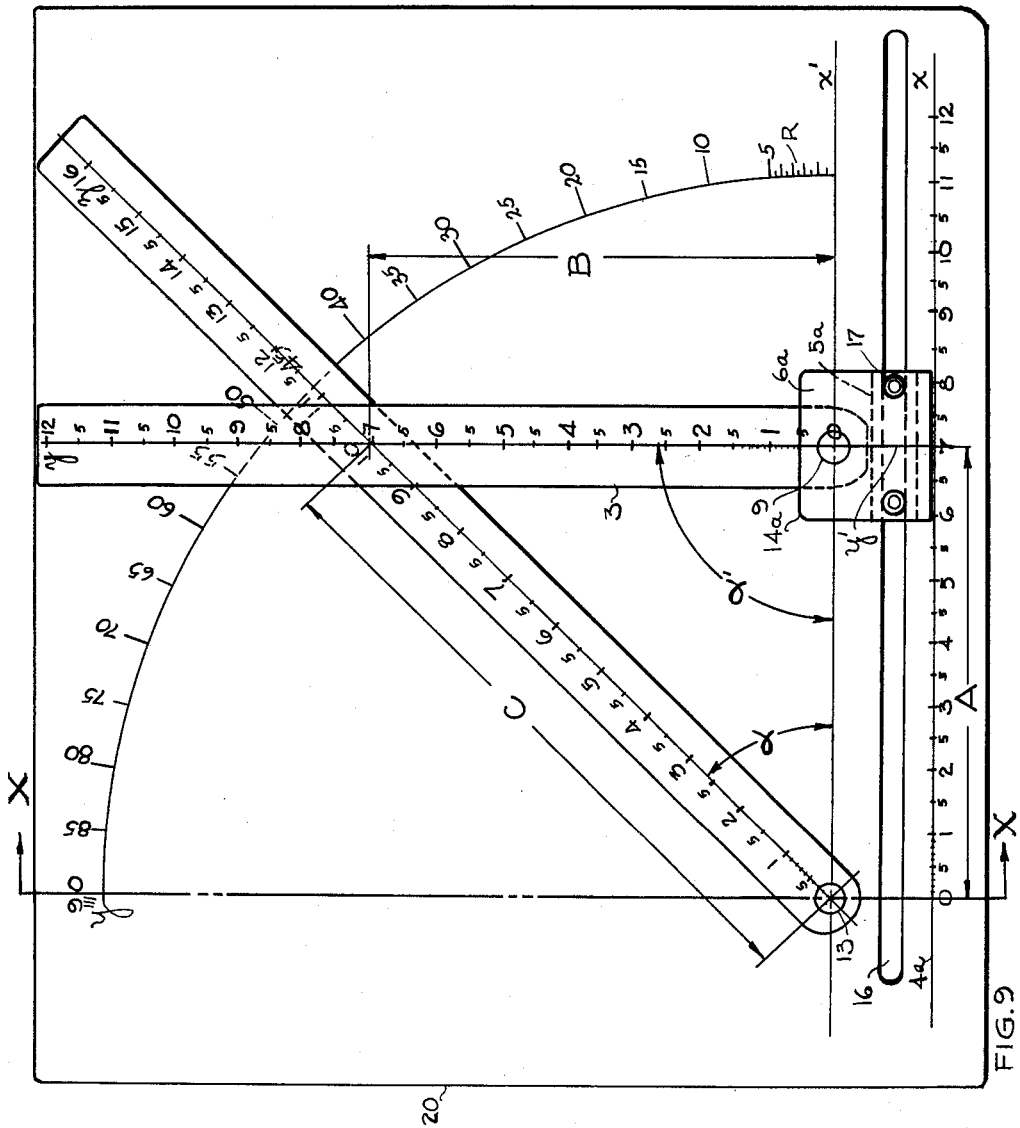
FIGURE 9 is a plan, similar to FIGS. 1 and 5, and showing the translational member guided by slot engagement.
Figure 10:
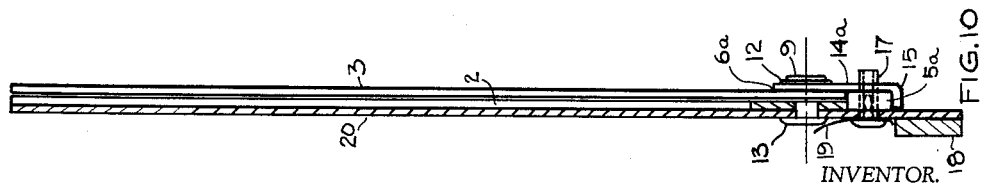
FIGURE 10 is a sectional view on line X—X of FIG. 9.

In the specific embodiment of the invention illustrated in said drawings, the reference numeral 1 in FIGS. 1, 5 and 6, and numeral 20 in FIGS. 9 and 10, designate a basal plate of suitable size, shape and material, here shown as substantially rectangular and preferably comprised of a moderately stiff sheet of plastic or the like which may be transparent if so desired. In conjunction with this basal plate or sheet, there are provided three scale members 2, 3 and 4, of which member 4 extends along the bottom margin and is fixed with respect to and located at the upper face of said basal plate and provides a combined horizontal straight edge and a longitudinal scale line $x$ with traversing scale markings of small increments of length, such as shown in larger detail in FIG. 2, appearing on the upper face of said member 4 and intersecting said longitudinal scale line. In FIG. 9, the straight edge is constituted by a longitudinal slot 16 paralleling the longitudinal scale line $x$, which, together with scale markings of small increments of length are imprinted directly on plate 20, thus incorporating this particular scale member as an integral part of the plate. It will be noted that whereas the straight edge and longitudinal scale line $x$ are coincident in FIGS. 1 and 5, this circumstance is not to be considered a necessary restriction as FIG. 9 illustrates them as distinct from each other but parallel. In their entirety, the longitudinal and traversing markings in the several illustrations will be designated herein as the $x$-scale, and it will be observed that there are twelve main divisions indicated in FIGS. 1 and 9 and fourteen indicated in FIG. 5 for emphasizing that it is a matter of choice in manufacture as to the extent of the scale. Desired sub-divisional markings may be provided between successive main division markings to divide the main divisions into halves, tenths and twentieths as shown in detail in FIG. 2, or into any other desired increments of length. The scale markings begin at the left at a zero location. For aid to the user, the main division markings have associated number readings successively from zero to the maximum number of such divisions, for instance, zero to twelve or fourteen or other chosen maximum. All distances between each of the main subdivisions are equal to each other and the scale is intended to afford readings of linear dimensions.

Figure 8:
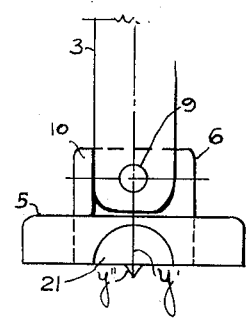
FIGURE 8 is a plan of the under face of the slide and pivoted member the upper face of which is shown in FIGS. 1 and 5.

Above-mentioned scale member 3 is of transitional character, being mounted both to be swung and to be translationally movable, and thus capable of change in angularity with respect to and change in its location along fixed member 4 and the $x$-scale thereof. As used herein, translational location or movement refers to selected positioning without a change of angularity, while transitional movement designates either a translational or an angular change, or both. Transitional mounting for scale member 3 is shown accomplished in FIGS. 1, 5, 6, 7 and 8 by a mounting assembly or rider 14 having the form of a T-head providing a leg 6 of flat transparent material an end margin of which overlaps the bottom end of scale member 3 in flat-wise relation thereto so that a pivot means 9, in the form of a rivet or its equivalent, may be passed through the overlapped portions and thereby secure the scale member pivotally to said leg. Below the end of the scale member, on the same face of the leg 6 overlapped by said scale member, is a crosspiece 5 which is fixed to said leg in perpendicular relation thereto, and on the opposite face of the leg is a corresponding but shorter cross-piece 7 also fixed in place flatwise of the leg. Considering the mounting assembly or rider in its entirety, the cross-pieces 5 and 7, with the portion of the leg 6 included therebetween, may be conveniently designated the foot, and it will be observed that the bottom of said foot is in a plane perpendicular to the upwardly projecting portion of the leg. The rider thus constructed may be used either face up, so that as shown in FIG. 1, the scale member 3 extends under leg 6, whereas in FIG. 8 the rider is turned the other side up so the scale member appears as overlapping said leg. No matter which side up the mounting assembly or rider is positioned, its foot may be located in longitudinal slidabe engagement with the straight edge of the fixed scale member 4. Indicia line $y'$ from the pivotal center extends to the bottom edge of the foot perpendicular thereto for translational location of the rider 14 and scale member 3 with respect to scale member 4. In conjunction with, or in lieu of, said indicia line $y'$ the mounting assembly or rider 14 may be provided with a pointer $y''$ projecting from the lower end of leg 6 to in part overlie the $x$-scale for reading the scale without involving parallax in doing so.

It will be readily appreciated that as the foot of rider 14 is slid along in contact with the straight edge of scale member 4, that the center or axis of pivot 9 will move along a hypothetical line $x'$ in parallelism to said straight edge and longitudinal scale line $x$. The pivoted and transitionally movable scale member 3 has a longitudinal hair line $y$ extending longitudinally thereof from the pivotal center to the outer end of said member and shown medially between the side edges of said member and with traversing scale markings corresponding in spacing and numerical indicia to the spacing and indicia of the fixed $x$-scale markings so as to afford like readings of length. This longitudinal hair line $y$ and its associated markings will be referred to as the $y$-scale. The zero end of said $y$-scale thus provided starts at the center of pivot 9, and the scale length may be made to meet demands of use, and here shown as sufficient to provide twelve main divisions. Preferably the scale member 3 is made of a transparent material and the scale and other markings are enscribed on what is normally the under face of said member so as to avoid parallax in making readings on another scale appearing thereunder in use. Said pivoted and translational member 3 may be arranged to have a limited range of swing in one direction if so desired, and in the specific showing of FIGS. 1, 5 and 8, may be swung from juxtaposition with hypothetical line $x'$ at the left of pivot 9 upward through an angle of 90° so as to then be perpendicular to line $x'$ and scale line $x$ of the fixed scale member 4. In said FIGS. 1, 5 and 8, the leg 6 to which said member 3 is pivoted is provided at one side thereof with a stop 10 in the path of swing of said member in exact position to limit the angularity of the member with respect to the straight edge of the foot of the mounting to exactly 90°. If an obtuse angle of more than 90° is desired, the assembly is turned upside down. The assembly may be used as a T-square when at the 90° position. In order to maintain the transitional member 3 at whatever angle it may be intentionally swung to, suitable frictional retaining means are provided, such as a spring washer 12 indicated in FIG. 7 as applied to pivot 9 under the head thereof and against the proximate face of the leg 6 of the movable mounting 14.

The third scale member 2 is pivoted only, and is not translationally movable. Pivoting means, such as rivet 13, attaches this solely swingable member 2 directly to the top face of basal plate 1 or 20, the center or axis of said pivot being directly above the zero marking of the fixed $x$-scale and on hypothetical line $x'$. If occasion in use arises, the transitional or slidable and swingable scale member 3 may be slid to a position at which its pivot 9 may overlie and register axially with the pivot 13 of the solely swingable member 2 so as to locate both pivots in axial alingment. The solely swingable member 2 is provided with suitable frictional retention in order to maintain it at any angular position to which it is set, which may be accomplished by predetermined tightness of riveting or by a spring washer as above described for pivot 9, or otherwise. Said solely swingable member 2 has what will be herein designated a $z$-scale comprising a longitudinal medial hair line $z$ with traversing scale markings corresponding in spacing and numerical indicia to the spacing and indicia of the other two scales. Said solely swingable member 2 is also preferably transparent. The hair line $z$ and other scale markings forming the $z$-scale, on this solely swingable member 2 are more desirably on the upper face thereof so as to avoid parallax with the markings of the transitionally movable member 3 which in normal intended use overlies it. The zero markings of this $z$-scale registers with the axial center of pivoting of solely swingable member 2, and the length of member 2 and number of markings may accord with wishes of the maker.

Centered on the pivoting axis of pivot 13 for the solely swingable scale member 2 and enscribed on the top surface of basal plate 1 or 20, is an arcuate scale for convenience designated the R-scale having transversal divisional markings representing a quadrant of degrees starting at zero at the intersection with hypothetical line $x'$ so that the 90° transversal marking will lie upon a line $y'''$ perpendicular to hypothetical line $x'$ and crossing that line at the center of curvature of said arcuate R-scale. An angle $\alpha$ between the hair line $z$ of the solely swingable member 2 and the hypothetical line $x'$ may be directly made by swinging the said member to the corresponding reading of angle or degrees on the R-scale. In FIG. 5, desired angle $\alpha_2$ between the hypothetical line $x'$ and translational member 3 is also made with respect to the same arcuate R-scale by first locating the pivotal axis of that member in coincident alignment with the pivotal axis of the solely swingable member so as to be at the center of the arc of the R-scale. With the structure of FIGS. 1, 5 and 8, for any angle other than 90° the mounting 14 and scale member 3 carried thereby has to be first turned upside down, after which the axes are aligned and, for an acute angle, scale member 3 is placed rotatively over the corresponding degree reading of arcuate R-scale, after which the mounting is turned over to its normal side up whereupon angle $\alpha_2$ is located as an interior acute angle. Should an obtuse angle be required, the angle set while the mounting is upside down and the axes aligned will be to the number of degrees in the obtuse angle in excess of 90° or number of degrees less than 180°. Since the R-scale starts at the $x'$ line, direct reading thereon in setting the $y$-scale hair line is to mentally subtract the degrees of the obtuse angle from 180° and use the resultant as the degree marking on the R-scale over which the $z$-scale hair line is placed. Then, without returning the mounting to its normal right-side up position, it is merely slid along to desired position with respect to the $x$-scale where it presents the desired interior obtuse angle. With the construction of FIG. 9, where there is no stop limiting the swing of the $y$-scale member 3, it is not necessary to invert the assembly to set the obtuse angle, but as with previous outline it is inverted to set an acute angle.

In order to consolidate and elaborate on the specific description of the structure shown in FIGS. 9 and 10, even though in part repetitious, it is pointed out that therein is shown a rectangular basal plate 20 which may conveniently be composed of moderately stiff transparent sheet of plastic or the like in conjunction with which are provided three scale members 2, 3 and 4 of which member 4 is an integral part of said sheet included between the bottom edge thereof and a slot 16 parallel and proximate thereto. A basal $x$-scale appears on portion or member 4 with a longitudinal scale line $x$ and traversing scale markings providing small increments of scale divisions and indicia beginning with zero at the left end of the scale. The above-mentioned scale member 3 is of transitional character, being both swingable and translationally movable, and is pivoted at 9 proximate to its lower end to a rider or mounting 14a which is composed of a top plate or leg 6a that overlaps the lower end portion of transitional scale member 3 so as to receive said pivot 9, and extends therefrom substantially to the x-scale line x where it bends toward the basal plate to provide a lip 15 the lower edge of which rides close to said scale. An indicia line y' extends from the center of pivot 9 to said lip and downwardly on the lip so as to enable ready setting and to avoid parallax in doing so. A cross-piece or spacer 5a underlies leg 6a next to said lip and has adequate dimensions so as to straddle the slot 16 and extend longitudinally thereof beneath the full width of top plate or leg 6a. Presence and thickness of this cross-piece or spacer 5a elevates the swingable and translational scale member 3 sufficiently above the surface of the base plate 20 to enable said scale member to override the solely swingable scale member 2 as required in use.

Continuing description of FIGS. 9 and 10, attention is called to the fact that rider or mounting 14a is constructed to have slidable and guided engagement with fixed scale 4a by making suitable contact with the longitudinal edges of slot 16. One means of accomplishment of this purpose, is to provide tubular or other posts 17 near the side edges of the rider and projecting from the top of top plate or leg 6a and from the bottom of said cross-piece or spacer 5a and held in place by press fit, screw threads or otherwise. With the rider positioned either side up, the said posts therefore provide protruding ends of which a pair will be located in said slot 16 and of commensurate dimension therewith for sliding engagement with both edges of the slot. Snap buttons 22 may be inserted in the ends of the posts that are riding in said slot to maintain the posts therein both while sliding and when the rider is located at its desired position along the fixed scale. Frictional means in the nature of spring washers, conveniently comprised of plastic strips 19, may be included under the heads of the snap buttons to retain the rider from inadvertent sliding when once positioned where desired, and also to enable the user to pry the button loose when occasion arises for inverting the rider on the base plate.

It will be recognized, by the construction shown in FIGS. 9 and 10, that the rider is slidable in parallelism to fixed scale line x, and that the center of pivoting of scale member 3 will be moved along a hypothetical line x' paralleling said scale line. It is preferable to establish in manufacture such a relationship that when the rider 14a is as far to the left as it will go, the left-end post 17 then engages the left end of slot 16, and the indicia line y' on the rider will then register precisely with the zero reading on the fixed x-scale. If so desired, the zero scale line may be extended upwardly of plate 20 as a hair line y''' perpendicular to scale line x, this arrangement being conducive to setting the swingable scale members very accurately at right-angle positions relative to the fixed scale. It is appropriate to here observe that in this specific showing, the rider 14a does not provide any stop for locating the swingable member 3 at such a perpendicular position, and that said member may be swung to any desired angle from 0° to 180°, namely, from juxtaposition with line x' at the left of pivot 9 upward and across its 90° position, and downward through the remaining part of the 180° angle to register with said line x' at the right of the pivot 9. To the rear of sheet 20 is cemented elongated member 18 as shown in FIG. 10, running the full length of the sheet to thereby provide a mechanical structure for laying out work. Also, member 18 lifts sheet 20 to enable rivet head 13 to clear the surface on which the computer rests. This corresponds to the showing in FIG. 6 wherein metal strip 11, in addition to its other functions, lifts sheet 1 to enable rivet head 8 from the surface on which the computer rests.

The construction and attachment of the solely swingable scale member 2 providing the z-scale as illustrated in FIGS. 9 and 10 is in agreement with the description of the showing thereof in preceding figures herein, so that repetition of that description is deemed unnecessary. Likewise the arcuate R-scale centered at the axis of pivot 13 for the solely swingable member 2 is the same as heretofore described so that repetition will be here omitted. Frictional detaining means is provided in conjunction with each pivotal mounting.

The computer as above described is capable of solving various problems of which several may be outlined for a fuller understanding of the utility of the invention. For instance, to obtain the length of hypotenuse C and angle $\alpha$ of a right triangle, given the length of its legs A and B, the indicia y' of the rider is set on the x-scale at a reading corresponding to the length of leg given in the problem, namely distance A from the zero reading of that scale. Scale member 3 is placed in its right-angle position with respect to the x-scale. Solely swingable member 2 is swung on its pivot 13 to a position at which the hair line z thereon of its z-scale crosses the hair line y of the y-scale at exactly the reading on the said y-scale corresponding to the length B given as one of the known parameters of the problem. Reading on the z-scale at the point of crossing of the hair-lines may then be read directly as solution for the length C of hypotenuse desired, and the angle $\alpha$ can be directly read on the arcuate scale R where crossed by the hair-line z of the solely swingable member. The length C will of course be in the same units as the units of measure given in the problem for legs represented by lengths A and B. In a similar manner, given any two parameters of a right triangle, solution for the remaining two may be readily obtained by my improved computer.

Figure 3:
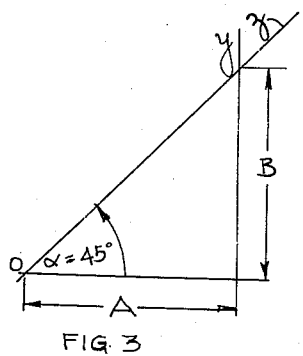
FIGURES 3 and 4 are diagrammatic triangulations showing use of the invention as a multiplier and divider.
Figure 4:
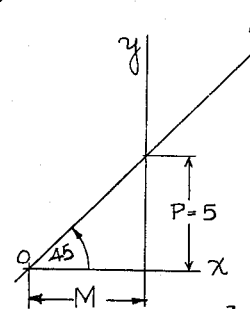

Another use for this computer, is to perform multiplication, and for explanation, reference is here made to FIGURES 3 and 4. In this type of calculation, rider 14 is first set at 10 on the x-scale for always first establishing a factor of 10. That having been done, reading of the multiplier as given by the problem is the distance B on the y-scale, and as a specific example let us say that the problem calls for ten as the multiplier, which means in this instance, B is equal to ten, so now the z-scale of the solely swingable member 2 is swung to a position where its hair-line crosses the hair-line of the y-scale at distance B, namely for this problem on scale reading of ten on the y-scale. This of course sets the solely swingable member 2 at a definite angle $\alpha$ which for this particular problem is 45°. The solely swingable member is then held fast at that angle and the rider 14 is moved to a distance M (FIG. 4) on the x-scale equal to the numerical value of the multiplicand given in the problem which is here designated as five for an example. The answer or product is then read as ten times the reading of distance P on the y-scale where its hair-line y again crosses the hair-line z of the sloping z-scale, so it will be found for the particular problem here given, that P is equal to five and the answer sought is five, times the factor of ten, which of course is fifty.

The fact that multiplication is performed can be demonstrated mathematically through the geometry of similar triangles. Hence, by geometry, the following mathematical relation is true:

(1) $$\frac{P}{B} = \frac{M}{A}$$

(2) $$P = M\frac{B}{A}$$

(3) Since $A = 10$, $10P = MB$

By a procedure similar to the above, division may be performed. For example, if the dividend of fifty and divisor of ten were given data, then, as in multiplication, rider 14 would be set on the x-scale at the reading of the factor of ten, namely at position of distance A, after which the solely swingable member would be swung to bring its hair-line z to cross hair-line y at the distance B representing the numerical value of the divisor in the problem, namely in this case, to the ten digit on the y-scale. This establishes angle α for the sloping member which is maintained as the rider is next moved to position of one tenth on the x-scale of the dividend in the problem, and as that has been given as fifty, the rider is set at reading five or distance M on the scale. Then the quotient may be read on the y-scale where the z hair line crosses and which is the distance P in the drawing and is the answer sought, which in this particular problem is the amount of five.

In addition to the examples of uses given above the improved computer of this invention has other uses such as solution of oblique triangles, checking results of trigonometric problems that have been solved by another method, and for other utilitarian purposes which will become evident to mathematicians, engineers, teachers, students and others versed in the art to which it appertains.

As a final observation, it will be found to enhance ease and accuracy of readings, to enscribe the scales that cross each other with different colors, for example, the arcuate scale R might be enscribed with black ink, the z-scale with green ink, and the y-scale with red ink.

An additional feature of computer shown in FIGURES 5 and 6, is the alnico V magnet 21 attached to the base of member 14. To enable cross-piece 5 to be drawn to edge as it is slid along straight edge of the fixed scale member 4, member 11 cemented underneath member 1 is strip of ferrous metal. Thus, member 11 not only lifts base of member 1 sufficiently to enable rivet head to clear surface on which computer rests, but also enables it to be magnetically attracted to the permanently magnetized magnet 21. In FIGURE 5 the semi-circular magnet is shown centrally located at base of member 14 and having the same thickness as leg 5. Its diameter lies in the plane of the bottom edge of the cross-piece or foot 5. Now when foot 5 is slid along the straight edge of the fixed scale member 4, the magnetic pull of the strong alnico magnet will cause base of cross-piece 5 to be constrained to continually ride against the straight edge.

The alnico V magnet could have other dimensions and shapes than the semi-circular shape shown. For example, it could be an elongated or a rectangular magnet fastened to the center section of the foot. Also it could be two rectangular, two circular or semi-circular pieces fastened to the lower ends of the foot.

The innovation of introducing the feature of magnetic attraction between two metallic materials for constraining the motion of the y-scale's base along a straight edge could also be an added feature of a mechanical computer in which y-scale member 3 is fixed to leg 6 and foot 5 so that a fixed 90° angle is maintained between hairline of members 3 and base of member 6. It will be apparent from the construction described, that both the ferrous metal member 11 of FIG. 6 and corresponding member 18 of FIG. 10 on the reverse or under face of plate or sheet 1 and 20 respectively, are usable as straight edges if the user chooses to employ the said plate with its reverse side upward for laying out work. When using the rider 14 in conjunction with use of the reverse face of said plate and said straight edge as a mechanical structure for laying out work and for solutions with delineations at desired angles and of prescribed lengths, the foot 5 of said rider 14 will be magnetically attracted to said member 11 by magnet 21.

I claim:

1. A computer of the character described, comprising a basal plate providing a top facial area and having an x-scale extending across said plate proximate to the bottom edge thereof and directed toward said facial area, means in parallelism to said x-scale inwardly on said area from said bottom edge and providing a straight edge margin in a plane perpendicular to and intercepting said area throughout the length of said margin, a rider having slidable guided engagement both on said area and against said straight edge margin, a swingable and translational y-scale member pivotally mounted on said rider between the under face of said rider and facial area of said plate and translationally movable with said rider with its pivot center above said area and offset laterally at a constant distance from said straight edge margin, a solely pivoted z-scale member having its pivot center fixed on said basal plate on said facial area thereof offset laterally at a distance from said straight edge margin the same as said constant lateral offset distance of the y-scale pivot from said straight edge margin and on a line perpendicular to the said x-scale from the zero reading of said x-scale, and an arcuate scale on said basal plate facial area centered thereon at the said pivot center of said solely swingable z-scale member.

2. A computer in accordance with claim 1, wherein said y-scale member and said z-scale member are transparent throughout the lengths and breadths thereof and wherein longitudinal and transverse scale markings are provided on the surfaces of each which are normally in contact with each other when one member crosses the other thereby avoiding parallax in making settings and readings involving both of said scales and affording full view of the crossing portions of said scale markings of both of said scale members.

3. A computer in accordance with claim 1, wherein said swingable and translational member has its pivotal mounting at an elevation above said basal plate and at an elevation higher than the pivot of said solely pivoted scale member whereby said translational member is movable both to a position of juxtaposition of its pivot center to the center of said arcuate scale and to position of superposition in axial alignment with said pivot center of the solely swingable member.

4. A computer in accordance with claim 2, wherein said rider provides a projection on its reverse side enabling said rider to be applied either face up on said basal plate and in both positions to have sliding engagement with said straight edge.

5. A computer of the character described, comprising a basal plate having a top face providing a facial area, an x-scale member extending across said basal plate providing a straight edge margin located in contact with and projecting upwardly from said facial area and terminating said facial area thereat, a rider having sliding guided engagement against said facial area and having a foot edge slidable against and guided by said straight edge margin, a swingable and translational y-scale member pivotally mounted on said rider and in normal position projecting beneath the under face of said rider between said under face of the rider and facial area of said plate and translationally movable with said rider with its pivot center above said area and offset laterally to a position over said area at a constant distance from said straight edge margin, a solely pivoted z-scale member having its pivot center fixed on said basal plate on the facial area thereof and offset laterally at a distance thereon from said straight edge margin the same as said constant lateral offset distance of the y-scale pivot from said straight edge margin and on a line perpendicular to said x-scale from the zero reading of said x-scale, and an arcuate scale on said basal plate facial area centered thereon at the said pivot center of said solely swingable z-scale member.

6. A computer of the character described, comprising a basal plate having a top face and a longitudinal slot therein extending across said face and providing a straight edge, an x-scale on said top face proximate and parallel to said slot on said top face, a rider having guided sliding engagement against said top face and having means slidable against and guided by said straight edge, a swingable and translational y-scale member pivotally mounted on and translationally movable with said rider with its pivot center over said face and offset laterally from said slot at a constant distance from said straight edge, a solely pivoted z-scale member having its pivot center fixed on said basal plate on said face thereof and offset laterally from said slot at a distance from said straight edge the same as and in the same direction as said constant offset distance of the y-scale pivot from said straight edge and on a line perpendicular to the said x-scale from the zero reading of the x-scale, and an arcuate scale on said top face of the basal plate thereon at the said pivot center of said solely swingable z-scale member.

7. A computer in accordance with claim 6, wherein said means projects from opposite faces of said rider and selectably insertable and slidable in said slot for enabling said rider and y-scale member pivoted thereto to be used either side up.

8. A computer comprising a basal plate, an x-scale member of material magnetically non-attractive secured to said plate and providing a straight edge directed inwardly of said plate at the top thereof, a rider mounted for guided sliding movement against said edge, a y-scale member pivoted to said rider a predetermined distance inwardly of said plate from said straight edge, a z-scale member pivoted to said plate inwardly thereof at the same predetermined distance from said straight edge as said pivoting of the y-scale member therefrom, a permanent magnet carried by said rider directed toward said x-scale member and straight edge, and a fixed metallic member extending longitudinally of and proximate to and offset from said straight edge in a direction outwardly therefrom so as to be out of contact from said magnet for maintaining slidable guided contact between said rider and said straight edge during transitional setting of said rider to desired scale setting along said x-scale member.

9. A mechanical computer for multiplying two quantities by physically presenting triangular configurations of a geometric problem, said computer comprising a base member containing a straight edge, an arcuate linearly-graduated scale and a linear horizontal scale with graduations, a translationally movable member providing a linear vertical scale and means including a permanent magnet and a cooperating metal element to which the magnet is attracted for maintaining contact between the bottom edge of said translationally movable member and said straight edge, non-magnetic means being provided to maintain separation of said magnet and element for permitting sliding of said movable member on said straight edge, and a third member providing a radial linear scale and pivoted at the center of curvature of said arcuate scale, each said scale having a longitudinal reference line and numbered graduations therealong; whereby multiplication is performed by first positioning the member containing the vertical scale with its reference line passing through the number ten graduation of the horizontal scale of the base member and then positioning the radial member so that its reference line crosses the vertical scale at the value of the multiplicand and while keeping the radial member fixed the vertical member is slid so that its reference line crosses the value of the horizontal scale corresponding to the multiplier, thereby indicating the product as ten times the value on the vertical scale when intersected by the reference line of the radial member.

10. A device of the character described, comprising a basal plate having a flat face provided with a superposed straight edge near to and parallel with but facing in a direction opposite from direction of one edge of said flat face, a rider having sliding engagement against said face and provided with a foot with an edge slidable against said straight edge, a permanent magnet carried by said foot for maintaining contact between said rider foot and said straight edge, and a magnetically attractive strip proximate to but spaced from said magnet when the magnet is attracted toward the same as to maintain the magnet out of contact from said strip during engagement of the foot with said straight edge for permitting sliding of said foot on said straight edge.

11. A device in accordance with claim 10, wherein said strip is located underneath said plate at the part thereof having the superposed straight edge.

12. A device of the character described comprising a basal plate, a first scale member of non-magnetic material fixed with respect to said plate and providing a straight edge parallel to and facing inwardly with respect to a proximate outer edge therebehind of said plate, a translationally movable second scale member having a foot toward and slidable against said straight edge, a permanent magnet carried by said foot, and a magnetically attractive strip proximate to but offset from said straight edge in a direction away from said foot and toward said outer edge of the plate behind said straight edge, for maintaining contact between said foot and straight edge and at the same time retained out of contact from said magnet.

References Cited in the file of this patent
UNITED STATES PATENTS

| | | |
|---|---|---|
| 200,060 | Hitt | Feb. 5, 1878 |
| 875,783 | Cote | Jan. 7, 1908 |
| 1,639,580 | Thompson | Aug. 16, 1927 |
| 1,886,370 | Bolton | Nov. 8, 1932 |
| 2,306,677 | Ward | Dec. 29, 1942 |
| 2,403,614 | Ross | July 9, 1946 |
| 2,701,096 | Wattier | Feb. 1, 1955 |
| 2,822,736 | Padgett | Feb. 11, 1958 |

FOREIGN PATENTS

| | | |
|---|---|---|
| 133,577 | Great Britain | Oct. 16, 1919 |